Dec. 3, 1968          D. W. KELBEL          3,414,098
POSITIVE CLUTCH WITH MULTIPLE FRICTION SYNCHRONIZING DISKS
Filed Oct. 5, 1966
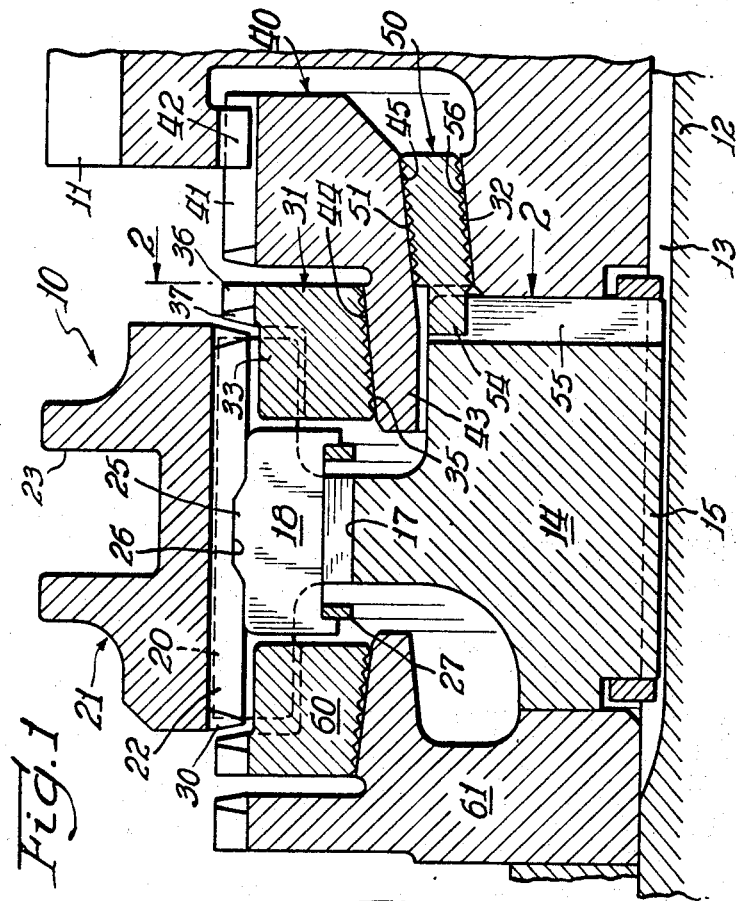
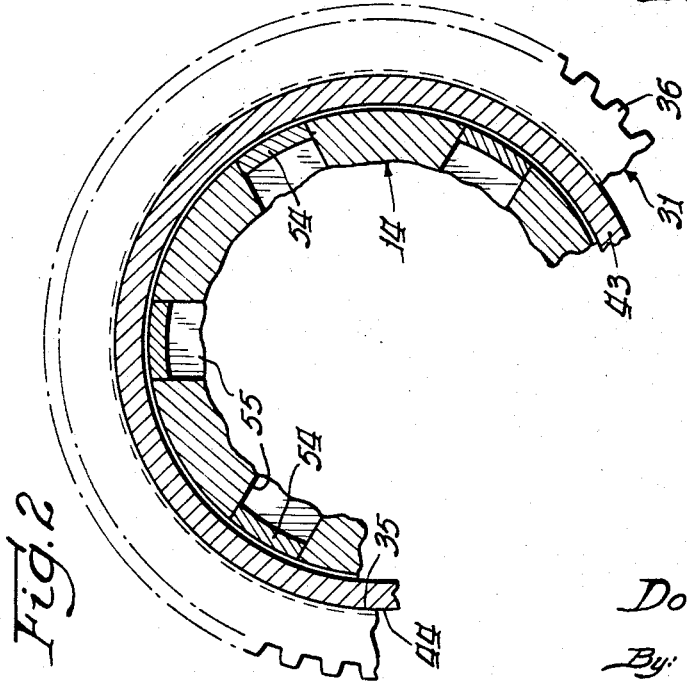
Inventor:
Donald W. Kelbel
By: Robert L. Zieg Atty.

United States Patent Office 3,414,098
Patented Dec. 3, 1968

3,414,098
POSITIVE CLUTCH WITH MULTIPLE FRICTION SYNCHRONIZING DISKS
Donald W. Kelbel, Muncie, Ind., assignor to Borg-Warner Corporation, Chicago, Ill., a corporation of Illinois
Filed Oct. 5, 1966, Ser. No. 584,534
9 Claims. (Cl. 192—53)

ABSTRACT OF THE DISCLOSURE

A synchronizer having a hub with a synchronizer ring drivingly connected thereto shiftable to establish a frictional connection between the hub and a gear to be synchronized therewith including a clutch sleeve drivingly connected to the hub and shiftable to establish a positive driving connection between the hub and the gear, a clutch drum drivingly connected to and axially movable with respect to the gear having a pair of clutch surfaces thereon, an annular ring drivingly connected to the hub and having clutch surfaces thereon engageable with one of the surfaces on said drum and a clutch surface on the gear, and the other clutch surface on the drum adapted to be engaged by said ring.

---

One object of this invention is to provide an improved synchronizer structure of the type using blocking rings wherein thrust bars are used to apply thrust to the blocking rings when a clutch sleeve is moved axially, the blocking rings acting to establish a frictional driving connection between the parts to be brought into synchronization and a clutch sleeve is provided to establish a positive driving connection between the two relatively rotating components after the components are brought into synchronization by means of the frictional driving connection.

It is another object of the invention to provide an improved synchronizer of the type shown above which utilizes a multiple friction surface conical clutch structure that affords a greatly increased frictional area as compared to known conical clutch type synchronizers without any increase in the diameter of the cone clutch or the related transmission components.

It is a further object of the present invention to provide an improved synchronizer having a greatly increased torque capacity due to the use of an improved form of conical clutch construction with eliminates the necessity for increasing the radial size of the components as is usually done to increase torque capacity.

It is a further object of this invention to provide an improved synchronizer having increased torque capacity and life wherein the improved structure has the same axial length as conventional synchronizers.

The invention consists of the novel constructions, arrangements and devices to be hereinafter described and claimed for carrying out the above stated objects and such other objects as will be apparent from the following description of the preferred form of the invention illustrated with reference to the accompanying drawings wherein:

FIGURE 1 is an axial sectional view through a transmission synchronizer embodying the invention; and FIGURE 2 is a view partially in cross section taken as indicated by the line 2—2 of FIGURE 1.

In the known type of transmission synchronizer wherein a cone clutch is provided to establish the frictional driving connection for bringing relatively rotating members into synchronization such as that illustrated in the patent to White et al. No. 2,221,900, issued Nov. 19, 1940, the blocking rings such as member 29 in FIGURE 1 of the mentioned patent are provided with one clutch surface which engages with the conical clutch surface provided on the gear 19 as indicated by numeral 32. With this type of synchronizer structure it is difficult to adapt the synchronizer for transmission of increased torque. The known methods for providing the increased torque capacity consist mainly of increasing the diameter of the friction clutch parts of the synchronizer to provide a torque arm of increased radius for the friction clutch with reference to the axis of the gears to be brought into synchronization.

It will be apparent that limitations exist in attempting to increase the diameter of the synchronizer parts since it would require a larger transmission case and take more space within a vehicle. With the improved synchronizer structure described herein increased torque capacity is obtained by means of approximately tripling the effective frictional clutch area as opposed to increasing the radius of the parts of a known synchronizer structure.

Copending application S.N. 452,654 filed May 3, 1965, of common assignee also provides a synchronizer structure having an approximately tripled clutch area. The invention herein constitutes an improvement over the above mentioned copending application by provision of a structure which is easier to manufacture and has basic structural differences and advantages thereover as will be apparent from the following description.

Referring to FIGURE 1 the synchronizing assembly 10 is illustrated as used in a transmission including a rotary part of gear 11 and a shaft 12. The shaft 12 is provided with splines 13. A hub or torque transmitting member 14 is provided including splines 15. Splines 15 of the hub 14 engage splines 13 on the shaft 12 and drivingly connect the hub and shaft.

The hub has three slots 17 provided therein. Received within the slots 17 are thrust bars 18. External splines 20 are provided on the hub 14. A clutch sleeve 21 is provided which encircles hub 14 and has internal splines 22 which engage with the splines 20 in the hub 14 to provide a driving connection. The clutch sleeve 21 has a circumferential groove 23 provided therein to receive a shifting fork (not illustrated).

The thrust bars 18 have a raised portion 25 which is engaged within a circumferential inner groove 26 cut in the clutch sleeve; circular wire springs 27 are provided which urge the thrust bars 18 radially outwardly into engagement with the clutch sleeve 21. The internal splines 22 of the clutch sleeve are provided with a chamfer at each end as indicated at 30.

A blocking ring or synchronizing ring 31 is provided which has raised sections 33 formed therein which engage in slots 17 in hub 14 to provide driving connection between the hub 14 and the blocking ring 31. The blocking ring 31 is provided with an inner or female conical clutch surface 35. The blocking ring 31 has external clutch teeth 36 which are chamfered as indicated at 37.

A clutch drum 40 is provided which has external splines 41. The gear 11 has internal splines 42 thereon which mate with splines 41 to drivingly connect drum 40 and gear 11. The clutch drum 40 has an axially extending portion 43 thereon. The clutch drum 40 has an external clutch surface 44 and an internal clutch surface 45. The surface 44 is on extension 43 while the surface 45 is in part on extension 43. The clutch surfaces 44 and 45 are generally conical and substantially parallel as illustrated although they may have a wide variation of angular relationship depending upon the design requirements.

Disposed between the gear 11 and the clutch drum is an annular means or clutch ring 50. The clutch ring 50 has a pair of parallel conical clutch surfaces 51 and 52 provided thereon. The surface 51 is a male or external conical clutch surface and the surface 52 is a female or internal conical clutch surface. A series of tangs 54 are provided equally spaced around the edge of the clutch ring 50 adjacent hub 14. A matching plurality of radial slots 55 are provided on the end face of hub 14 which are engaged by the tangs 54 of the clutch ring 50 to provide a positive driving engagement between the hub 14 and clutch ring 50 but at the same time permit relative axial movement between the hub and the clutch ring.

The gear 11 is provided with an external conical clutch surface 56 which is adapted to be engaged by the conical clutch surface 52 on the clutch ring 50. The gear 11 is adapted to be driven by the external splines 41 of the clutch drum 40 when the sleeve 21 is shifted axially so that the teeth or splines 20 thereon engage teeth 41 after synchronization is completed.

On the left side of hub 14 a standard form of synchronizer is illustrated having a blocking ring 60 adapted to synchronize a gear 61 when the clutch sleeve 21 is moved to the left.

The operation of the synchronizer of the present invention is as follows. When the clutch sleeve 21 is moved to the right to engage the gear 11 the thrust bars 18 will move therewith to bear against and urge blocking ring 31 to the right which will first have the effect of engaging the clutch surface 35 on the blocking ring 31 with the clutch surface 44 on the clutch drum 40. When this engagement takes place there will be a slight axial movement of the clutch drum 40 which will be effective to engage the clutch surface 45 on the clutch drum 40 with clutch surface 51 on clutch ring 50 and also engage the clutch surface 37 on the clutch ring 50 with clutch surface 56 on gear 11.

This initial engagement will cause the blocking ring 31 to turn with the gear 11 and thus cause a relative rotation between the blocking ring 31 and the hub or torque transmitting member 14 in the direction of the movement of the part which is rotating at a greater speed, thus causing the chamfered surfaces of the teeth 36 of the blocking ring 31 and the splines 22 on the clutch sleeve 21 to move into blocking register. Once the blocking ring moves into blocking register continued movement of the clutch sleeve 21 will be resisted by the chamfered surfaces of the teeth 36, even though considerable force is applied to the clutch sleeve 21 tending to cause it to move into its desired positive engagement with the teeth 41 on drum 40. Therefore a resistance to positive clutch engagement will exist until the gear 11 arrives at a synchronous speed with the clutch sleeve 21 at which point there will be a relative reversal of movement causing the blocking ring 31 to move to a position where the teeth 36 on the blocking ring are in register with the internal splines 22 on the clutch sleeve 21. When such a position is assumed there will be no further resistance to movement of the clutch sleeve 21 and it may therefore be urged onwardly into positive engagement with the teeth 41 on the drum 40, the yielding connection between the thrust bars 18 and the clutch sleeve 21 breaking away under the force applied to move the clutch sleeve 21. A positive clutching action is now provided between the clutch sleeve 21, drum 40, and gear 11 and the gear 11 is in positive driving engagement with the shaft 12.

The synchronizing structure on the opposite side of the hub 14 from gear 11 is illustrated as of the conventional type, however, it may also be of the improved type as described in the above description depending upon the type of transmission in which the synchronizer is to be used.

From the foregoing description it will be apparent that the friction clutching action of the synchronizer takes place by the engagement of three pairs of conical clutch surfaces. Thus there has been provided an improved friction clutch arrangement for synchronizing the hub 14 with the gear 11 in which a cone clutch structure is utilized which provides a greatly increased area of clutch surface as compared to know synchronizers of the cone clutch type.

The use of the improved clutch drum 40 having an axial extension 43 with conical clutch surfaces thereon provides three engaging pairs of friction surfaces while not requiring an axial stacking arrangement as provided in many types of multiple friction-surface synchronizers. By thus not requiring an axial stacking of cone clutch parts the necessary increase in radius of parts is avoided by the improved structure described above.

The clutch drum 40 of the present invention differs from that shown in copending application S.N. 452,654 mentioned above in that clutch drum 40 is provided with external splines engageable by clutch sleeve 21 so that the clutch drum provides the positive driving connection between sleeve 21 and gear 11. In the copending application additional teeth 57 were provided on gear 11 to be engaged by sleeve 21.

Thus the present structure is advantageous over that in the copending application in that one set of clutch teeth (57) has been eliminated. Further, the clutch drum of the present invention is more easily manufactured by means of standard machining technology. It has been found that the clutch drum of the copending application having clutch surfaces at an obtuse angle is relatively difficult to manufacture.

While the invention is susceptible of various modifications and alternative constructions, a preferred embodiment is diagrammatically shown in the drawings and is herein described in detail. It is to be understood, however, that it is not thereby intended to limit the invention to the specific form disclosed. On the contrary it is intended to cover all modifications and alternative constructions falling within the spirit and scope of the invention as expressed in the appended claims.

I claim:

1. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said ring, a clutch drum having means thereon drivingly connecting said drum to said gear and allowing movement of said drum with respect to said gear and having a pair of clutch surfaces thereon, one of said clutch surfaces on said drum being frictionally engageable by said ring, a clutch surface on said gear, annular means drivingly connected to and engaging said hub, said annular means interposed between said gear and said drum and having clutch surfaces engageable with said gear clutch surface and one of said drum clutch surfaces whereby when said clutch sleeve is axially shifted said clutch drum will be frictionally engaged by said ring and said annular means to synchronize said gear and said hub prior to establishment of said positive driving connection and said sleeve being engageable with the means on said clutch drum to establish said positive driving connection.

2. A synchronizer as claimed in claim 1 wherein said annular means has an internal and an external clutch surface thereon, said external clutch surface being engageable with one of said clutch surfaces on said drum, said internal clutch surface being engageable with the clutch surface on said gear.

3. A synchronizer structure as claimed in claim 1 wherein said clutch drum has external teeth thereon, said gear having internal teeth meshing with the teeth on said clutch drum whereby when said sleeve is shifted axially said positive driving connection is established from said sleeve through said drum to said gear.

4. A synchronizer mechanism as claimed in claim 1 wherein said clutch drum is adapted to be positively drivingly connected to said clutch sleeve to establish the positive driving connection between said sleeve and said gear.

5. A synchronizer structure as claimed in claim 4 wherein said clutch drum has external teeth thereon, said clutch sleeve and said gear having internal teeth, the internal teeth of said gear meshing with the external teeth on said drum and said positive driving connection being established between said hub and said gear by intermeshing of said external teeth on said clutch drum with the internal teeth on said clutch sleeve.

6. A synchronizer structure as claimed in claim 1 wherein said annular means has a plurality of tangs thereon, said hub having a plurality of radially extending slots thereon, said tangs being engaged within said slots to establish a driving connection between said annular means and said hub.

7. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially to establish a positive driving connection between said hub and said gear, a clutch drum drivingly connected to and axially movable with respect to said gear, and having a pair of clutch surfaces thereon, a clutch surface on said gear, one of said clutch surfaces on said drum being frictionally engageable by said ring, annular means disposed between said gear and said drum and having clutch surfaces engageable with said gear clutch surface and the other clutch surface on said drum, said clutch drum having means thereon wherein a positive driving connection is established between said clutch sleeve and said drum when said clutch sleeve is shifted axially, said clutch drum thereby completing the positive driving connection between said clutch sleeve and said gear.

8. A synchronizer structure as claimed in claim 7 wherein said annular means is drivingly connected to and engages said hub.

9. A synchronizer mechanism as claimed in claim 8 wherein said annular means has an internal and an external clutch surface thereon, said external clutch surface being engageable with one of the clutch surfaces on said clutch drum and said internal clutch surface being engageable with the clutch surface on said gear.

References Cited

UNITED STATES PATENTS 3,272,291 9/1966 Flinn _____ 192—53
3,286,801 11/1966 Wojcikowski _____ 192—53

FOREIGN PATENTS 1,385,860 3/1964 France.

BENJAMIN W. WYCHE III, *Primary Examiner.*

L. J. PAYNE, *Assistant Examiner.*